(12) United States Patent
Guo et al.

(10) Patent No.: US 10,928,267 B2
(45) Date of Patent: Feb. 23, 2021

(54) METHOD FOR ACQUIRING UNBALANCE AMOUNT OF ROTOR

(71) Applicant: BEIJING SYTH TESTING CO., LTD., Beijing (CN)

(72) Inventors: Weijian Guo, Beijing (CN); Fang Jiang, Beijing (CN)

(*) Notice: Subject to any disclaimer, the term of this patent is extended or adjusted under 35 U.S.C. 154(b) by 67 days.

(21) Appl. No.: 15/817,177

(22) Filed: Nov. 18, 2017

(65) Prior Publication Data

US 2018/0073953 A1 Mar. 15, 2018

Related U.S. Application Data

(63) Continuation of application No. PCT/CN2016/080976, filed on May 4, 2016.

(30) Foreign Application Priority Data

May 19, 2015 (CN) .......................... 201510256483.6
Jul. 7, 2015 (CN) .......................... 201510395297.0

(51) Int. Cl.
*G01M 1/30* (2006.01)
*G01M 1/16* (2006.01)
(Continued)

(52) U.S. Cl.
CPC ............... *G01M 1/30* (2013.01); *F16F 15/28* (2013.01); *G01M 1/16* (2013.01); *G01M 1/32* (2013.01)

(58) Field of Classification Search
CPC ............ G01M 1/30; G01M 1/32; G01M 1/16; G01M 1/14; F16F 15/28; Y10T 29/49;
(Continued)

(56) References Cited

U.S. PATENT DOCUMENTS 5,757,662 A * 5/1998 Dyer ................. B23Q 11/0035
700/279
2005/0065712 A1* 3/2005 Skilton .................. F01D 5/027
701/124
(Continued)

FOREIGN PATENT DOCUMENTS

CN 201508271 U 6/2010
CN 103115724 A 5/2013
(Continued)

OTHER PUBLICATIONS

Yang,Yafei et al.;Balancing Method of Dynamic Unbalance Amount of Centrifuge; Journal of Chinese Inertial Technology, vol. 16, No. 2, Apr. 30, 2008; ISSN: 1005-6734; p. 249-252.
(Continued)

*Primary Examiner* — Sarang Afzali
*Assistant Examiner* — Darrell C Ford
(74) *Attorney, Agent, or Firm* — Erson IP (Nelson IP)

(57) ABSTRACT

A method for acquiring unbalance amount of a rotor, comprises: manufacturing a rotor where the rotational journal of the rotor forms the rotation axis of the rotor; mounting the connecting part to the rotational journal of the rotor to form an assembly where the connecting part forms the rotation axis of the assembly, the connecting part and the rotor can be rotated with a relative angle, and the relative position between the rotation axis of the rotor and the rotation axis of the rotor assembly is kept unchanged before and after the rotor and the connecting part are relatively rotated with the certain angle.

6 Claims, 16 Drawing Sheets

(a)

(b)

(51) Int. Cl.
*G01M 1/32* (2006.01)
*F16F 15/28* (2006.01)

(58) Field of Classification Search
CPC ......... Y10T 29/49002; Y10T 29/49012; Y10T 29/49718
USPC ................... 29/428, 592, 592.1, 598, 402.01
See application file for complete search history.

(56) References Cited

U.S. PATENT DOCUMENTS

| | | | | |
|---|---|---|---|---|
| 2005/0119847 A1* | 6/2005 | Park | ........................ | G01M 1/34 702/105 |
| 2008/0075592 A1* | 3/2008 | Lee | ........................ | F01D 5/027 416/1 |
| 2009/0025476 A1* | 1/2009 | Braghiroli | ............. | G01M 1/225 73/459 |
| 2009/0070050 A1* | 3/2009 | Baehr | .................... | G01H 1/003 702/56 |
| 2011/0036166 A1* | 2/2011 | Lenz | ....................... | G01M 1/16 73/455 |
| 2020/0193740 A1* | 6/2020 | Sabina | .................... | G01P 21/00 |

FOREIGN PATENT DOCUMENTS

| | | |
|---|---|---|
| CN | 103776587 A | 5/2014 |
| CN | 105021349 A | 11/2015 |
| CN | 204788804 U | 11/2015 |
| GB | 1340418 A | 12/1973 |

OTHER PUBLICATIONS

International Search Report of PCT/CN2016/080976, dated Jul. 26, 2016.

* cited by examiner (a)          (b)

METHOD FOR ACQUIRING UNBALANCE AMOUNT OF ROTOR

CROSS-REFERENCE TO RELATED APPLICATIONS

This application is a continuation of International Patent Application No. PCT/CN2016/080976 with a filing date of May 4, 2016, designating the United States, now pending, and claims priority to Chinese Patent Application No. 201510256483.6 with a filing date of May 19, 2015 and No. 201510395297.0 with a filing date of Jul. 7, 2015. The content of the aforementioned applications, including any intervening amendments thereto, are incorporated herein by reference.

TECHNICAL FIELD

The present invention is related to a method for acquiring the unbalance amount of a rotor.

BACKGROUND OF THE PRESENT INVENTION

The current ISO standard to test and evaluate balancing machine and the unbalance of rotor is ISO21940-21 (2012) Description and Evaluation of Balancing Machines" (updated from ISO 1502953-1999). The proving rotor, the test and evaluation terms and procedures, which are recommended by the standard, are traditional method originated from the history. The measured unbalances are not traceable.

For measuring unbalance, the problem of current technology is: when using balancing machine to measure unbalance, it is unclear whether the unbalance amount and angle measured by a balancing machine is correct due to the fact the unbalance measurement traceability is not established in the current technology. When measuring unbalance of a rotor on the balancing machine, the measured unbalance is the vector sum of the unbalance of the whole system composed of the machine itself and the rotor, instead of the unbalance of the rotor itself; in some cases, the variation force caused by the parts on the balancing machine which touch and have relative movement against the rotor, also superposition in the form of unbalance into the unbalance of the rotor.

Hence, it is necessary to invent a new method, overcoming the problem of the current technology, to acquire the true unbalance of the rotor, realize the traceability of unbalance measurement.

SUMMARY OF PRESENT INVENTION

In view of the above mentioned technical problems, the present invention is to provide a method for acquiring the unbalance amount of a rotor, eliminating other influence factors except the unbalance of the rotor itself, so as to acquire the unbalance amount of the rotor itself. The present invention further provides a method for manufacturing the mass weight to make the unbalance of the mass weight to be traceable; in addition, the present invention also provides a method for measuring the unbalance amount of the rotor; through correcting the measured unbalance of the rotor, a rotor with the unbalance smaller than a set value is obtained. Mount the mass weight with the traceable unbalance to the rotor with zero unbalance, the rotor with the traceable unbalance is obtained, thus realize the unbalance measurement with traceability.

Implementation of the present invention provides a method for acquiring the unbalance amount of the rotor through following procedures: make a rotor, the rotor possesses the rotation axis then mount the connecting parts onto the rotor to form an assembly, the rotation axis of the assembly is formed by the connecting parts, the rotor and the connecting part can be rotated relatively by certain angle, the relative position between the rotation axis of the rotor and the rotation axis of the assembly is kept unchanged before and after the rotor and the connecting part being rotated relatively with the angle; select the measuring planes on the rotor, and use the balancing machine to measure the unbalances of the assembly in the selected planes; rotate the rotor a certain angle with respect to the connecting parts, measure the unbalance of the assembly in the selected planes again; in above two measurements, the amount of the unbalance of the rotor is not changed, only the angle of its unbalance is changed with the above rotating angle; the difference between two measured unbalance of the assembly is the direction of the unbalance of the rotor being changed with the above angle. Through vector calculation of the results in two measurements, the unbalance of the rotor is acquired.

For many balancing machine users, usually during the balance measurement, the selected axial limit surface on the rotor is with the good surface finish, the variation force of the axial limit and the drive caused by the balancing machine to the rotor can be ignored, using the method in this implementation to acquire the unbalance of the rotor can fulfill the inspection requirement of the balancing machine users for the unbalance of the rotor.

In Implementation 2, a method for acquiring the unbalance amount of the rotor includes the following procedures: make a rotor, the rotor possesses the rotation axis, then mount the connecting part onto the rotor to form an assembly, the rotation axis of the assembly is formed by the connecting part, set zero angle reference point for the balance measurement on one of the connecting part; the rotor and the connecting part can be rotated with relative angle, the relative position between the rotation axis of the rotor and the rotation axis of the assembly is kept unchanged before and after the rotor and the connecting part being rotated relatively with the angle; select the measuring plane on the rotor, then use the balancing machine to measure the unbalance of the assembly in the selected plane, during measuring the unbalance of the assembly by the balancing machine, the balancing machine contact the rotor via the connecting parts, the rotor has no contact with the balancing machine except contacting the connecting part; rotate the rotor a certain angle with respect to the connecting parts, measure the unbalance of the assembly in the selected measuring plane again; in two measurements, the amount of the unbalance of the rotor is not changed, only the angle of the unbalance is changed with the above rotating angle: the difference between two measured unbalance of the assembly is the direction of the unbalance of the rotor being changed with the above angle. Through the vector calculation of the results in two measurements, the unbalance of the rotor is acquired.

Through the above method, completely eliminate the factors which have the influence on the unbalance of the rotor except the rotor itself during the balance measurement, thus the unbalance of the rotor is acquired. The balancing machine manufacturers, the balancing laboratory or the metrological organizations for balance measurement, can use the implementations of the present invention to acquire the unbalance of the rotor, make the proving rotor for the dynamic balancing, and realize the traceability of the unbalance measurement.

Implementation 3 to acquire the unbalance of the rotor has two following methods. Method 1 preferably includes the following procedures: manufacture more than one journal on the rotation axis respectively at two ends of the rotor, two journals at the outer side of the rotor form the rotation axis of the rotor; the connecting part is sleeve, mount the two sleeves respectively on the two journals at the outer side of the rotor to form the assembly, the outer circles of the two sleeves form the rotation axis of the assembly; the rotor and the sleeves can be rotated relatively with a certain angle, the relative position between the rotation axis of the rotor and the rotation axis of the assembly is kept unchanged before and after the rotor and the sleeves being rotated relatively with the angle; select the measuring plane on the rotor, then use the balancing machine to measure the unbalance of the assembly in the selected plane; rotate the rotor a certain angle with respect to the sleeves, then measure the unbalance of the assembly in the selected plane again; through the vector calculation of the results in two measurements, the unbalance of the rotor is acquired.

For many balancing machine users, using the methods in this implementation to acquire the unbalance of the rotor can fulfill the inspection requirement of the balancing machine users for the unbalance of the rotor.

Method 2 preferably includes the following procedures: manufacture more than one journal respectively at the two ends of the rotor, the two journals at the outer side of the rotor form the rotation axis of the rotor; the connecting part is sleeve, mount the two sleeves respectively on the two journals at the outer side of the rotor to form the assembly, the outer circles of the two sleeves form the rotation axis of the assembly, set zero angle reference point for balance measurement on one of the sleeves; the rotor and the sleeves can be rotated relatively with a certain angle, the relative position between the rotation axis of the rotor and the rotation axis of the assembly is kept unchanged before and after the rotor and the sleeves being rotated with the relative angle; select the measuring plane on the rotor, then use the balancing machine to measure the unbalance of the assembly in the selected measuring plane; during measuring the unbalance of the assembly by the balancing machine, the balancing machine contact the rotor via the sleeves, the rotor has no contact with the balancing machine except contacting with the sleeves; rotate the rotor a certain degree with respect to the sleeves, then measure the unbalance of the assembly in the selected measuring plane again; through the vector calculation of the results in two measurements, the unbalance of the rotor is acquired.

This method eliminates the factors which have the influence on the unbalance of the rotor except the rotor itself, thus the unbalance of the rotor is acquired. Balancing machine manufacturers, dynamic balancing laboratory and metrological organizations for dynamic balancing can use the implementations of the present invention to acquire the unbalance of the rotor, manufacture the proving rotor for dynamic balancing, and realize the traceability of the unbalance measurement.

Implementation 4 of the present invention provides a method for manufacturing the rotor with the unbalance smaller than the set value, the procedure of the method is following: acquire the unbalance of the rotor by using the methods in above Implementation 1, Implementation 2 and Implementation 3; correct the unbalance of the rotor in order to make the unbalance of the rotor smaller than the set value.

Multiple above-mentioned measurements and corrections can be made for the rotor, when the unbalance of the rotor is smaller than the allowable tolerance range, the unbalance of the rotor can be regarded as zero.

By this way, the rotor with zero unbalance is obtained. When the rotor with zero balance is obtained, it can be used to calibrate the balancing machine, thus calibrate a zero point of the balancing machine.

Implementation 5 of the present invention provides a method for making the unbalance weight being with the traceable unbalance, the method comprising the following steps: making a weight, wherein the weight is axisymmetric; the weight has two surfaces perpendicular to the symmetry axis of the weight; selecting one or two planes perpendicular to the rotation axis of the rotor; providing a mounting structure on the planes of the rotor; mounting the weight to the mounting structure on the planes and allowing one surface of the weight contact the rotor; measuring the unbalance of the rotor having the weight; removing the weight from the rotor, and remounting the weight to the rotor plane after changing the direction of the weight, allowing another surface of the weight contact the rotor; using a balancing machine to measure the unbalance of the rotor having the weight; when a difference of the two unbalances obtained in the above steps is smaller than a set value, obtaining the weight with correct mass center; wherein the unbalance produced by the weight with correct mass center is the product of the mass of the weight and the distance between the mass center of the weight and the rotation axis of the rotor; the direction of the weight is the mounting angle of the weight; when the two unbalances obtained in the above steps is not the same, modifying the mass of the weight and repeating the measuring and correcting steps until the two obtained balances are the same.

After the weight with the traceable unbalance is made, mount this weight on the rotor with zero unbalance, thus the rotor with the weight has the traceable unbalance. When the rotor with zero unbalance and the rotor with traceable unbalance amount is prepared, the calibration and the inspection for any balancing machine can be made to make the balancing machine with the accurate measurement, and the unbalance measured on the balancing machine is with the traceability.

Implementation 6 of the present invention provides a method for making the weight being with the traceable unbalance, preferably machining at least one thread hole in each selected plane of the rotor, the mounting section of the weight is made as the thread stud, machining two planes perpendicular to the symmetric axis of the weight between the thread studs at two ends of the weight and the middle section of the weight. By this way, the weight with the thread studs on two ends and with the traceable unbalance is made.

After the weight with the traceable unbalance is made, mount this weight onto the rotor with zero unbalance, thus the rotor is with the traceable unbalance. When the rotor with zero unbalance and the rotor with the traceable unbalance is prepared, the calibration and the inspection for any balancing machine can be made to make the balancing machine with the accurate measurement and the unbalance measured by the balancing machine is with the traceability.

Implementation 7 of the present invention is a method for measuring the unbalance of the rotor, the method includes the following procedures: the balance machine is in horizontal layout and uses the roller to support the rotor, the axial limit by the balancing machine to the rotor is acted in the center of the end surface of the rotation axis of the rotor, zero angle reference point for the unbalance of the rotor is set on the rotor, when using this reference point as the basic reference to measure the unbalance, the drive unit of the balancing machine accelerates the rotor to the measuring speed, and then the drive unit disengages with the rotor automatically or the drive unit supplies no more driving power, the rotor rotates only by the inertia, make the measurement under the inertial rotation of the rotor, all the parts on the balancing machine contacting the rotor and having the relative movement to the rotor have no variable force to the rotor in the direction perpendicular to the rotation axis of the rotor; after the first measurement, make a new reference point deviating a certain angle from the reference point, use this new zero angle reference for the unbalance as the basic reference, measure the unbalance of the rotor for the second time; through the vector calculation of the unbalance in the first measurement and the unbalance in the second measurement, the unbalance of the rotor is acquired.

This is a simple method for acquiring the unbalance of the rotor itself.

Implementation 8 of the present invention gives a rotor assembly which includes rotor and sleeve, the rotational journal is arranged respectively at the two ends of the rotor, the rotational journals generate the rotation axis of the rotor, the sleeves are mounted onto the rotational journals; the outer circles of the sleeves form the rotation axis of the assembly, the rotor and the sleeves can be rotated for a relative angle; the relative position between the rotation axis of the rotor and the rotation axis of the assembly is kept unchanged before and after the rotor and the sleeves being rotated for a relative angle.

Through the above assembly, according to the methods and the procedures mentioned in the present invention, the unbalance of the rotor itself can be acquired. Correct the unbalance of the rotor itself, the rotor with the unbalance smaller than the set value is obtained.

Implementation 9 of the present invention gives a rotor assembly, in this rotor assembly, the rotor is made with the inner circles, the inner circles form the rotation axis of the rotor, the sleeves are mounted inside of the inner circles; the inner holes of the sleeves form the rotation axis of the assembly; the rotor and the sleeves can be rotated for a relative angle; the relative position between the rotation axis of the rotor and the rotation axis of the assembly is kept unchanged before and after the rotor and the sleeves being rotated for a relative angle.

Through the above-mentioned assembly, according to the methods and the procedures mentioned in the present invention, the unbalance of the rotor itself can be acquired. Correct the unbalance of the rotor itself, the rotor with the unbalance smaller than the set value is obtained.

DETAILED DESCRIPTION OF PREFERRED EMBODIMENTS

Sample Implementation of the present invention is prescribed in this section with the help of the illustrations. For easier explanation, the implementation procedures are basically in the order of the realization of the present invention, but some sections not necessarily sequential, and the prescribed procedure is not unique. The procedure is for illustrative purpose, not all the steps are necessary, as long as that the invention can be realized with the steps. The method and procedure prescribed in this section do not in any way limit the protection area of the present invention.

Figure 1:
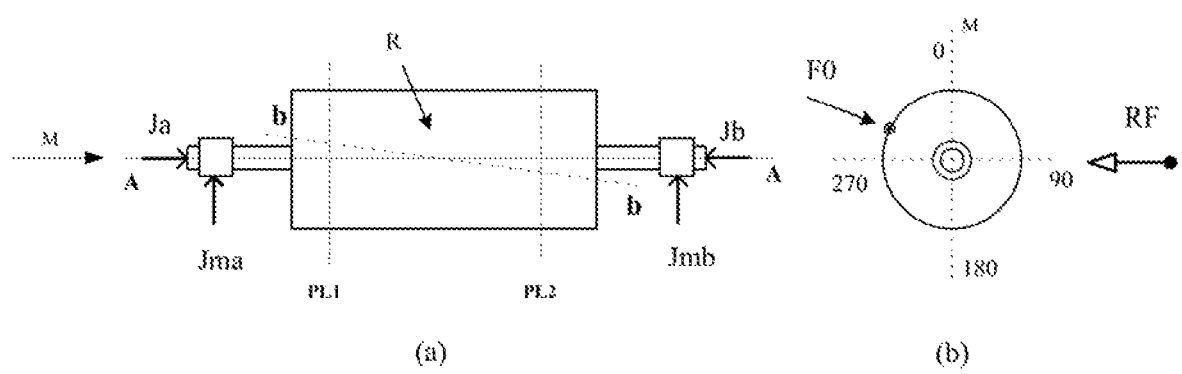
FIG. 1 is the schematic drawing of a rotor, (a) is the main view of the rotor, (b) is the side view of the rotor.

A. As shown by FIG. 1, for a given rotor R, (a) of FIG. 1 is the main view of the rotor, (b) is the side view of the rotor. When the mass distribution of the rotor R, i.e. its mass axis b-b is not in the same line as the rotation axis A-A of the rotor, this rotor R possesses unbalance. The rotor mentioned in the present invention is rigid rotor, i.e. the mass and the mass distribution of the rotor is constant, and the unbalance is not changed with the different measuring speed. The mass axis b-b of the rigid rotor is constant. Unbalance is a vector, with the amount and the direction. The unbalance of a rotor R can be presented by the unbalances in any two selected planes perpendicular to the rotation axis of the rotor, see to the plane PL1 and PL2 in FIG. 1. For the rotor with the same unbalance, when select the different planes the amount and the direction of the unbalance is different, but it can be converted mutually. For rotor with a low ratio of axial length to its radius, the unbalance can be presented in one plane.

The support part Jma and Jmb on the balancing machine is used to support the left rotational journal and the right rotation journal of the rotor, to form the rotation axis A-A of the rotor. That is, the rotation axis of the outer circle of the rotational journal is the rotation axis A-A of the rotor. The support part on the balancing machine have many types, such as the roller, bearing housing, V-shape block, expanding mandrel etc.

Balancing machine has the axial limit to the rotor, see to Ja and Jb in FIG. 1.

Balancing machine should accelerate the rotor to the measuring speed to realize the unbalance measurement. Balancing machine has different drive types for the rotor, such as roller drive, belt drive etc.

Set zero angle reference point on the rotor, see to F0 in (b) of FIG. 1. In some cases, zero angle reference point can be set on the drive unit of the balancing machine.

Balancing machine is installed with the angle sensor, see to RF in (b) of FIG. 1, to measure the unbalance direction of the rotor, i.e. the angle of the unbalance with respect to zero angle reference point.

When the rotation axis of the rotor is fixed and the measuring plane is selected, the amount of the unbalance is unique. The direction of the unbalance, or in other words, the angle of the unbalance is related with the setting of zero angle reference point.

Figure 2:
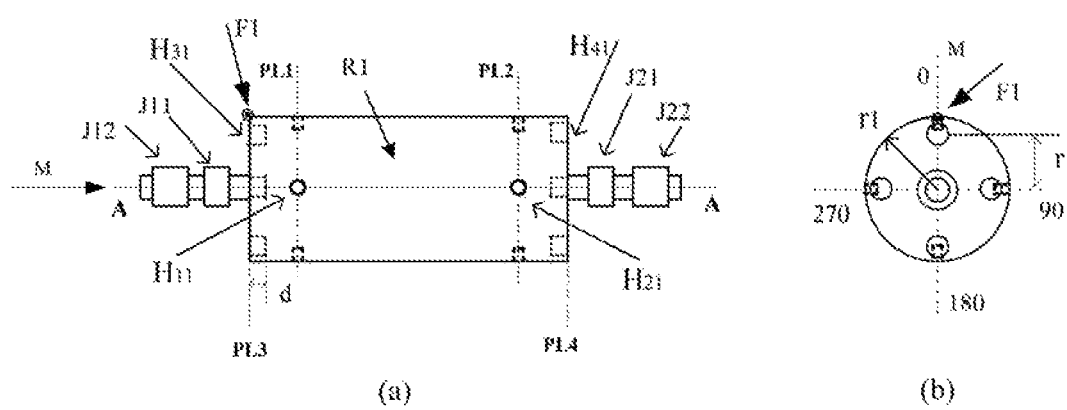
FIG. 2 is the schematic drawing of a rotor R1, (a) is main view, (b) is the side view.

B. FIG. 2 shows a rotor R1. The outer radius of the rotor R1 is r1. Select two planes PL1 and PL2 perpendicular to the rotation axis to represent the unbalance of the rotor R1. On the outer circle of the rotor corresponding to the plane PL1 and the plane PL2, machine at least one thread hole, the center line of the thread hole should point to the rotation axis of the rotor, in the sample of this implementation, machine 4 thread holes being apart with 90 degrees respectively in the plane PL1 and the plane PL2. The thread holes are machined to mount the mass weight onto the outer circle of the rotor. Mark the two thread holes at the 90 degree in the plane PL1 and the plane PL2 as H11 and H12 respectively.

Manufacture two journals on the rotation axis at the left end and the right end of the rotor R1 respectively, mark two journals at the left end respectively as J11, J12, mark two journals at the right end respectively as J21, J22. The rotation axis of the rotor is formed by the journal J12 at the left end and the journal J22 at the right end.

Make zero angle reference point F1 on the rotor, see to FIG. 2.

On the two ends plane PL3 and PL4 of the rotor R1, at the radius r with respect to the rotation axis A-A, symmetrically to the rotational center, machine the mounting holes parallel to the rotation axis of the rotor, the mounting holes are used to mount the mass weight. There is no special limitation for the number of the mounting holes, as long as at least there is one hole at each end surface. In the sample of this implementation, use four symmetric mounting holes at each end surface, the depth of the hole is d, there is no special limitation for the diameter. Mark the two holes at zero degree position in the plane PL3 and PL4 respective as H31 and H41.

C. The present invention provides below methods to manufacture the weight being with traceable unbalance, the weight is to be mounted to the outer circle of the rotor to generate the traceable unbalance.

Figure 3:
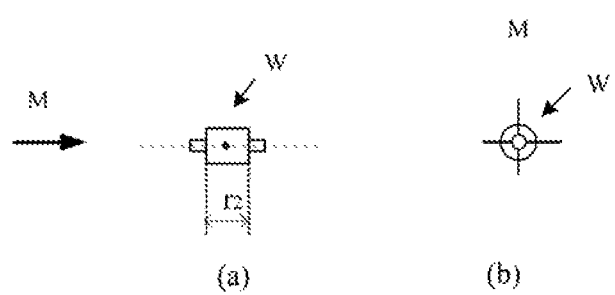
FIG. 3 is the schematic drawing of a mass weight, (a) is main view, (b) is side view.

Make two mass weights shown in FIG. 3, mark them respectively as W1 and W. The weight is with the cylindrical structure, its two ends are machined with the thread stud, the length of the middle section of the weight is r2, the middle section has two planes perpendicular to the center line of the thread stud, the weight can be screwed into the thread hole on the outer circle of the rotor R1 by the thread stud.

There is no special limitation for the weight structure, as long as it is with the axis symmetrical structure and two planes perpendicular to the symmetrical axis, its ends with the structure being mounted onto the rotor, so that when the weight being mounted onto the rotor, the plane of the weight can contact the corresponding plane of the rotor and the definite distance to the rotation axis of the rotor can be generated. Regarding the two ends structure of the weight and the mounting structure in the plane of the rotor for the weight, as long as the weight can be fixed onto the rotor and not fall off from the rotor R1, meanwhile the weight has the definite distance to the rotation axis of the rotor, the available methods in the current technology can be used, it is no pedal restriction here.

Figure 4:
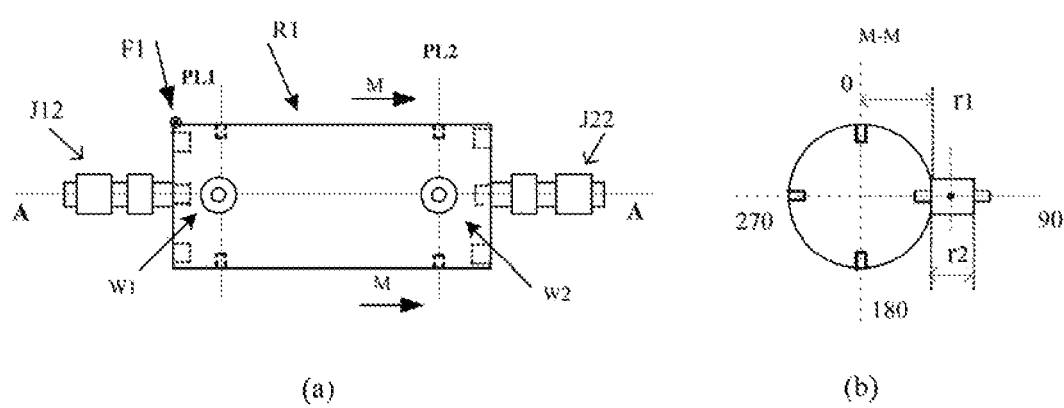
FIG. 4 shows the rotor mounted with the weight, (a) is main view, (b) is side view.

Screw any end of the weight W1 into any thread hole on the outer circle plane PL1 of the rotor R1, screw any end of the weight W2 into any thread hole on the outer circle plane PL2 of the rotor R1, make one end of the middle section of the weight contacting the outer circle of the rotor R1, in this sample, screw W1 into the thread hole fill screw W2 into the thread hole H21, see to FIG. 4. Place the rotor R1 with weights on the balancing machine, measure the unbalance of the rotor, and mark the unbalance in the plane PL1 and the plane PL2 respectively as Uf11 and Uf21; Unscrew the weight W1 and the weight W2 from the rotor R1, screw the other thread stud of the weight into the original thread hole in the plane PL1 and the plane PL2 again, make the end of the middle part of the weight contacting the outer circle of the rotor, measure the unbalance of the rotor in the plane PL1 and the plane PL2 again and mark them respectively as Uf12 and Uf22. If the amount of Uf12 and Uf12 is different, it means the mass center of weight W1 is not in the middle position, of its length r2; as per the amount of Uf12 and Uf2, make the mass correction for the weight W1. If the amount of Uf21 and Uf22 is different, it means the mass center of weight W2 is not in the middle position of its length r2; as per the amount of Uf21 and Uf22, make the mass correction for the weight W2.

Repeat the above measurement and correction, till the mass center of the weight W1 in the middle of its length r2, the mass center of the weight W2 in the middle of its length r2.

Use the scale to weigh the mass of the weights after the above procedures, mark the mass respectively as m1 and m2, and mark the weight being corrected and weighed respectively as W1D and W2D.

The amount of the unbalance generated by mounting the weight W1D onto any plane at the outer circle with radius r1 of the rotor is $m1*(r1+r2/2)$ (kg*m), the direction of the unbalance is determined by the mounting angle of the weight; the amount of the unbalance generated by mounting the weight W2D onto any plane at the outer circle with radius r1 of the rotor is $m2*(r1+r2/2)$ (kg*m), the direction of the unbalance is determined by the mounting angle of the weight.

Mass unit of the weight is kg, the unit for the outer radius of the rotor and the length of the middle section of the weight is m, angle unit is degree (can be converted to Rad), the amount and the direction of the unbalance generated by the weight W1D. W2D is related with the basic unit (mass kg and length m) in International Systems of Units and the auxiliary unit (plane angle radian rad) in International Systems of Units, i.e. the unbalance generated by the weight being made according to the above method can be traceable.

By this way, the mass weight for generating the traceable unbalance is made.

The amount of the unbalance generated by the traceable mass weight is only related with the mass of the weight and the distance between the mass center and the rotation axis of the rotor, the direction of the unbalance is related with the mounting angle of the weight; there is no direct relation with the amount and the direction of the unbalance being measured by the balancing machine, so when implementing the methods in the present invention to make the mass weights, it is only required that the balancing machine (or other equipment which can be used to measure the amount and the direction of the vibration) has relative measurement accuracy, i.e. has enough repeated measurement accuracy, the accuracy of the absolute measured value is not required.

D. Use below method for checking whether the display value including the amount and the direction measured by the balancing machine is accurate, if necessary, re-calibrate or compensate the display value of the measurement.

For the rotor R1 shown in FIG. 4, without mounting two mass weights, place the rotor R1 on the balancing machine for the measurement, the measured unbalance in the plane PL1 and PL2 are Ua11 and Ua21 respectively.

Mount the mass weight W1D on the plane PL1 of the rotor R1, mount the mass weight W2D on the plane PL2. The mass weight can be mounted into any thread hole of the rotor, in this sample, the two mass weights are mounted into the two thread holes H11 and H21 at 90 degree direction on the plane PL1 and the plane P12. Measure the unbalance of the rotor for the second time, the measured unbalance in the plane PL1 and P12 is Ua12 and Ua22 respectively.

Figure 5:
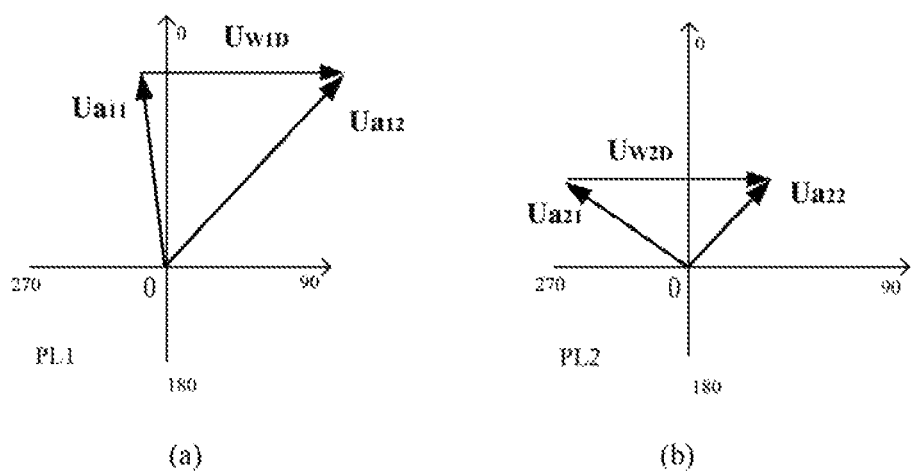
FIG. 5 illustrates the measured unbalance before and after the rotor mounted with the weight.

Plot the measured unbalance in the first measurement and the measured unbalance in the second measurement into the plane coordinates, see to FIG. 5. The origin of the coordinates is the zero amount of the unbalance, the zero degree of the coordinates is the zero angle reference point of the rotor R1.

The difference between the unbalance vector Ua12 and Ua11 is the unbalance generated by the weight W1D, the difference between the unbalance vector Ua22 and Ua21 is the unbalance generated by the weight W2D. If the amount and the direction of the difference between the unbalance vector of Ua12 and Ua11 is the same as the unbalance UW1D, the display value of the measurement on the balancing machine in the plane PL1 is accurate; If the amount and the direction of the difference between the unbalance vector of Ua22 and Ua21 is the same as the unbalance UW2D, the display value of the measurement on the balancing machine in the plane PL2 is accurate.

If the display value of the measurement on the balancing machine in any plane is not accurate, the balancing machine can be calibrated and compensated by the weight W1D or W2D, in order that the balancing machine display the accurate measured value.

E. The measured unbalance Ua1 and Ua21 of the rotor R1 on the plane PL1 and the plane PL2 according to above method is not only the unbalance of the rotor itself, but also includes the unbalance of the balancing machine itself, such as the unbalance of the fixture, the compensation of the unbalance in the measuring system, and the unbalance caused by the variation force on the rotor acted by the parts contacting with the rotor and having the relative movement with the rotor. In the present invention, below methods and procedures are used to decouple the unbalance of the rotor itself from the unbalance of other factors, thus the unbalance of the rotor itself is acquired.

E1. Manufacture two sleeves, the inner hole and the outer circle of the sleeves are machined precisely. Angle mark for 0 degree, 90 degree, 180 degree and 270 degree is made on the two sleeves and the rotational journal J12 and J22. The sleeve is shown in (a) and (b) of FIG. 6, (a) is main view and (b) is side view. On the sleeve at one end, set zero angle reference point F2 for the balance measurement.

Figure 6:
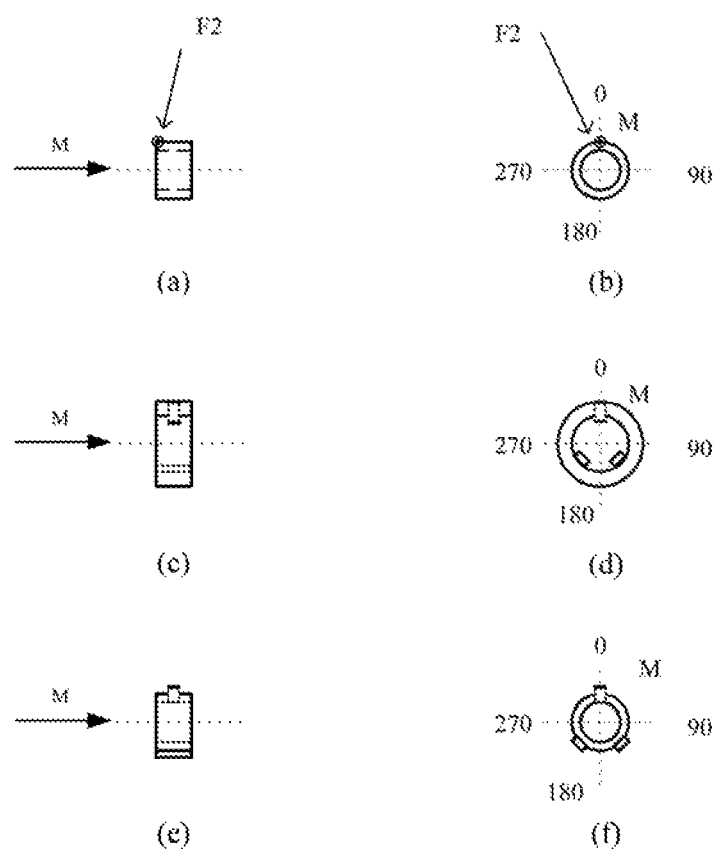
FIG. 6 shows sleeves; (a) and (b) show one type of the sleeve, (a) is main view, (b) is side views; (c) and (d) shows the second type of the sleeve, (c) is main view, (d) is side view; (a) and (f) are the third type of the sleeve, (e) is main view, (f) is side view.
Figure 7:
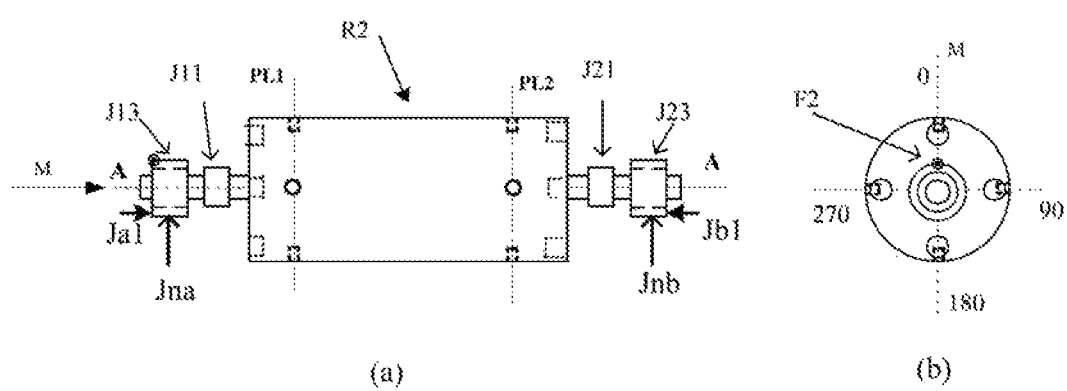
FIG. 7 is the schematic drawing of an assembly, (a) is main view, (b) is side view.

Mount two sleeves shown in FIG. 6 by heating on the rotational journal J12 and J22 at the outer side of the rotor R1, zero point mark on the sleeves and zero point mark on the two rotational journals J12 and J22 is aligned. The inner holes of the sleeves and the two rotational journals J12 and J22 at the outer side of the rotor R1 is kept in coaxial by slight interference fit. The rotor R1 being mounted with the two sleeves is regards as the assembly and marked as R2, see to FIG. 7. The outer circles of the sleeves form the rotational journals of the assembly, the rotational journals are marked as J13 and J23, the two journals form the rotation axis of the assembly. The rotational journals J12 and J22 of the rotor R1, or in other words the inner holes of the two sleeves form the rotation axis of the rotor R1. The rotational journals J12 and J13, and the rotational journals J22 and J23 is located at the same position in the axial direction of the rotor.

There is no special restriction for the structure of the sleeve, regarding the sleeves to be mounted on the rotational journal, as long as the same rotation axis is formed by the inner holes of the sleeves and by the rotational journals of the rotor R1, and the stable rotation axis is formed by the outer circles of the sleeves. It is not required that the inner hole and the outer circle of the sleeves is concentric. Another type of the sleeves is shown in (c) and (d) of FIG. 6, (c) is main view, (d) is side view; In the structure of this sleeve, two fixed and protruding support planes are machined at the bottom of the inner hole of the sleeve, an adjustable thread stud is arranged at the top, with this type of the sleeve, by screwing or unscrewing the adjustable thread stud, the sleeves can be dismounted and mounted easily onto the rotational journals of the rotor; after mounting the sleeves onto the rotor, the outer circles of the sleeves form the rotation axis of the assembly (e) and (f) in FIG. 6 shows the sleeves being mounted inside of the inner circle of the rotor, (e) is main view, (f) is side view; in the structure of this sleeve, two fixed and protruding support planes are machined at the bottom of the inner hole of the sleeve, an adjustable thread stud is arranged at the top, with this type of the sleeve, by screwing or unscrewing the adjustable thread stud, the sleeves can be dismounted and mounted easily inside of the inner circle of the rotor; after inserted the sleeves into the rotor, the inner holes of the sleeves form the rotation axis of the assembly.

As long as the inner hole and the outer circle of the sleeves (shown in (a) and (b) of FIG. 6) is machined precisely, or the corresponding place or the part of the inner hole and the outer circle (shown in (c) and (d) of FIG. 6) is machined precisely, so as to form the stable rotation axis by the inner hole and the outer circle of the sleeves, mount these sleeves onto the precisely machined rotational journals of the rotor (form the sable rotation axis) or mount these sleeves into the precisely machined inner circles (form the sable rotation axis is assured that the relative position between the rotation axis of the rotor and the rotation axis of the assembly mounted with the sleeves is kept unchanged before and after the rotor being rotated with respect to the sleeves.

E2. Place the assembly R2 onto the balancing machine. The support Jna and Jnb, the axial limit Ja1 and Jb1 for the assembly by the balancing machine and the drive to the assembly by the balancing machine are all realized by the two sleeves at the two ends, angle reference point for the unbalance measurement is set on the sleeve at one end of the rotor, through above procedures, the rotor R1 has no contact with any components on the balancing machine and form no association relationship with any component on the balancing machine, except contacting the two sleeves on the journals at the two ends see to FIG. 7.

Figure 8:
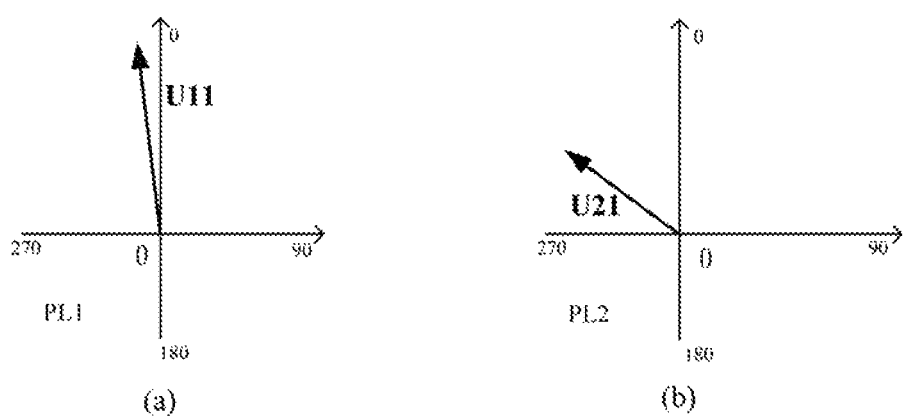
FIG. 8 illustrates the measured unbalance of the assembly by the balancing machine, (a) is the unbalance in the plane PL1, (b) is the unbalance in the plane PL2.

E3. Measure the unbalance of the assembly R2 by the balancing machine. In the method of this implementation, place the assembly onto the balancing machine with the horizontal support. It is no restriction for the mode of the support and the drive to the assembly R2, as long as the required condition in the above procedure E2 is fulfilled. The measured unbalance is marked as the unbalance U11 in the plane PL1 (measured unbalance in the first measurement, including the amount and the angle), and the unbalance U21 in the plane PL2. Plot the measured unbalance U11 and U21 in the first measurement to the plane coordinates, see to (a) and (b) in FIG. 8. The origin of the coordinates is zero amount point of the unbalance, the zero degree of the coordinates is the zero angle reference point on the assembly R2.

When measuring the unbalance, to improve the balancing accuracy, make multiple repeated measurements for the assembly R2 on each step, and record the average value of the multiple measurements as the measured unbalance value.

E4. Remove the assembly R2 from the balancing machine. Dismount the sleeves at the two ends of the assembly R2 by heating, route the journal J12 and J22 of the rotor R1 the same angle in the same direction with respect to the two sleeves, and then mount the two sleeves onto the journals of the rotor R1 by heating again. The angle that the rotor R1 rotates with respect to the sleeve is any value, in this sample, the rotor R1 is rotated 90 degrees clockwise with respect to the two sleeves.

Figure 9:
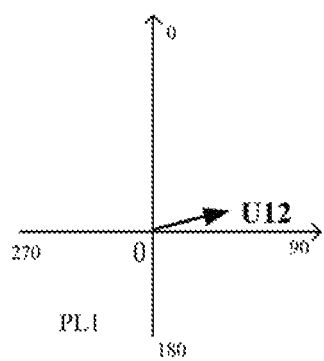
FIG. 9 illustrates the measured unbalance of the assembly in the second measurement after the rotor being rotated with respect to the sleeves for 90 degree, (a) is the unbalance in the plane PL1, (b) is the unbalance in the plane PL2.
Figure 9:
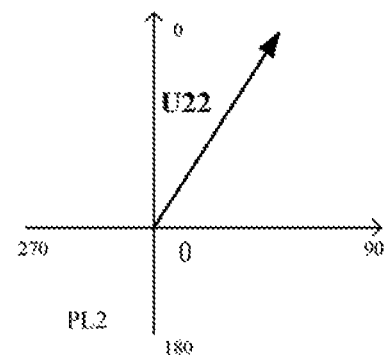

E5. Place the assembly R2 onto the balancing machine again, in the same condition with the first measurement, measure the unbalance again in the above mentioned two planes; the measured values are recorded as the unbalance in the second measurement, and marked as the unbalance U12 in the plan PL1 and the unbalance U22 in the plane PL2. See to (a) and (b) in FIG. 9.

The unique difference between the above two measurers measurements for the assembly R2 is the rotor R1 being rotated 90 degrees clockwise with respect to the two sleeves, other conditions including the rotation axis of the assembly R2, the rotation axis of the rotor R1 are the same in the above two measurements. The unbalance difference of the assembly in the above two measurements is only and completely caused by the above mentioned rotating angle of the rotor R1 with respect to the sleeves. In the two measurements, the amount of the unbalance of the rotor R1 is the same, the angle of the unbalance of the rotor R1 is rotated 90 degrees clockwise with respect to zero angle reference point on the sleeves.

The purpose to machine another two journals J11 and J21 next to the end surface at each end of the rotation axis of the rotor, is to check whether the relative position between the rotation axis of the rotor and the rotation axis of the assembly formed by mounting the sleeves is kept unchanged.

Figure 10:
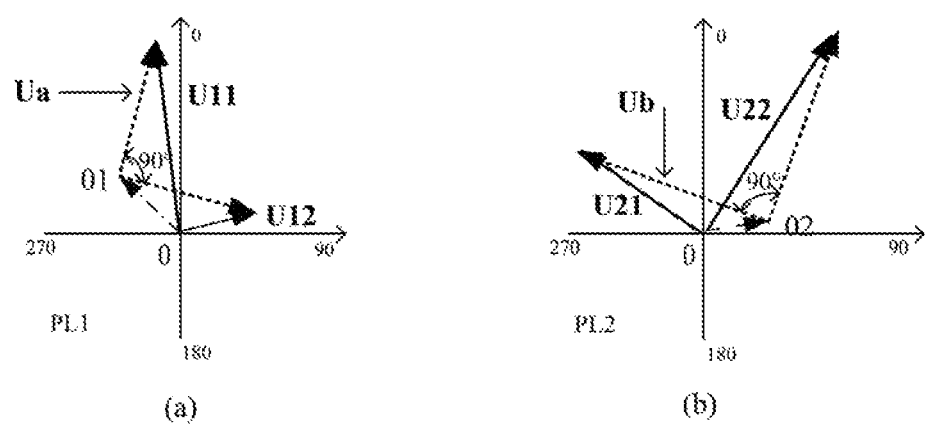
FIG. 10 illustrates the unbalance of the rotor by the vector calculation, (a) is the unbalance in the plane PL1, (b) is the unbalance in the plane PL2.

E6. Through the vector calculation of the results in the two measurements, the unbalance of the rotor with the rotation axis being formed by the rotational journal J12 and J22 is obtained, see to (a) and (b) in FIG. 10; the unbalance of the rotor R1 in the plane PL1 is Ua, the unbalance at the angle of 90 degree clockwise to Ua is the unbalance of the rotor R1 after being rotated 90 degree clockwise with respect to the sleeves, the amount of the unbalance is the same, but the direction of the unbalance of rotor R1 is changed 90 degree clockwise. The unbalance of the rotor R1 in the plane PI2 is Ub; the unbalance at the angle of 90 degree clockwise to Ub is the unbalance of the rotor R1 after the being rotated 90 degree clockwise with respect to the sleeves, the amount of the unbalance is no change, but the direction is changed 90 degree clockwise.

The vector 0-01 and the vector 0-02 from the zero point of the coordinates to the vertex of two 90 degree angles is the unbalance of the balancing machine in the plane PL1 and the plane 2 respectively, without the unbalance of the rotor R1.

To obtain the higher measuring accuracy, rotate the sleeves two or more times with respect to the rotor R1, repeat the above measurement procedures, and make the vectors calculation of the results measured in the two or more measurements.

F. Correct the unbalance of the rotor R1 in the plane PL1 and the plane PL2 to make the unbalance smaller than the set value.

By this way, the rotor with the unbalance smaller than the set value is obtained.

In order to make the unbalance of the rotor R1 in the plane PL1 and the plane PL2 approaching to zero, repeat executing the above-mentioned measurement procedure E and correction procedure F.

Figure 11:
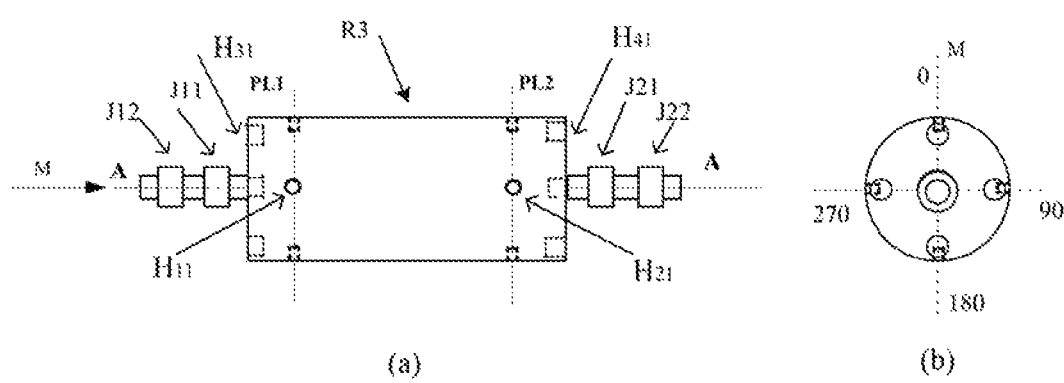
FIG. 11 shows the rotor with zero unbalance, (a) is main view, (b) is side view.

Thus, the rotor with zero unbalance (within the allowable error range) is obtained, mark this rotor as R3, see to FIG. 11.

G. Mount the weight with the traceable unbalance which being manufactured according to the above procedure C onto the outer radius of the rotor R3 of zero unbalance, the amount of the unbalance is m1*(r1+r2/2) (kg*m) after mounting the weight W1D in the plane PL1, the direction of the unbalance is determined by the mounting angle of the weight; the amount of the unbalance is m2*(r1+r2/2) (kg*m) after mounting the weight W2D in the plane PL2 of the rotor R3, the direction of the unbalance is determined by the mounting angle of the weight. In this sample, the weight W1D and the weight W2D is respectively mounted in the thread hole H11 and H21, i.e. the unbalance angle is both 90 degree.

Figure 12:
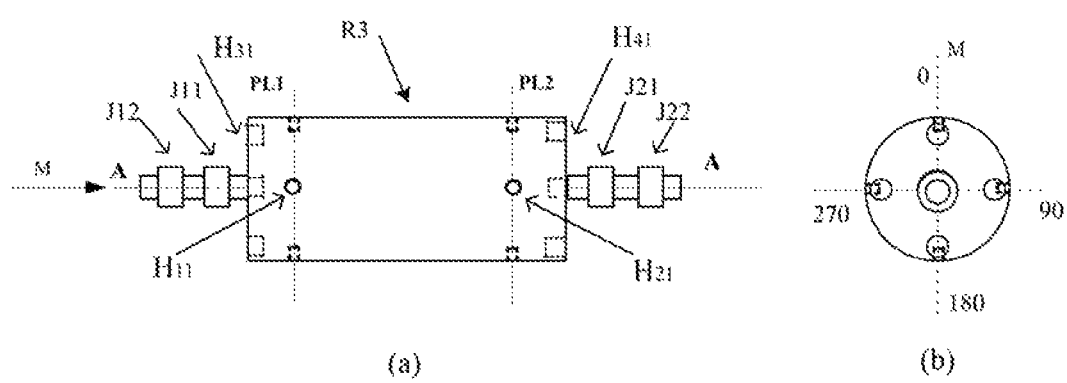
FIG. 12 shows the rotor with the traceable unbalance, (a) is main view of the rotor, (b) is the side view of the rotor.

Mass unit of the weight is kg, the unit for the outer radius of the rotor and the length of the middle section of the weight is m, angle unit is degree (can be converted to Rad), the amount and the angle of the unbalance caused by W1D. W2D is related to the basic unit (mass Kg and length M) International System of Units and the auxiliary unit (plane angle radian rad) in International System of Units, i.e., through the above method, the rotor with the traceable unbalance is obtained, mark this rotor as R4, see to FIG. 12.

H. By using the below method in the present invention, manufacture the weight with the traceable unbalance, and then mount the weight onto the rotor end surface perpendicular to the rotation axis, to generate the traceable unbalance.

Figure 13:
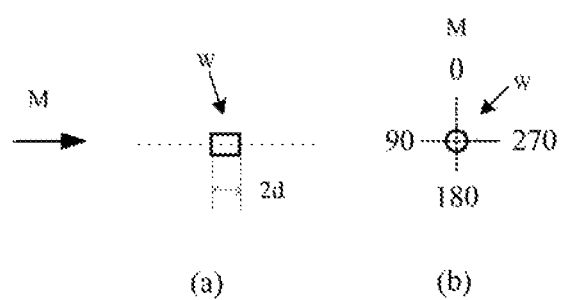
FIG. 13 shows one type of the weight, (a) is the main view of the weight, (b) is the side view of the weight.

Manufacture two cylindrical mass weights as shown in FIG. 13, mark them respectively as W3 and W4, it is no special requirement for the diameter of the weight, the length of the weight is 2d, i.e. twice as the depth of the mounting hole. Mark the four angles of 0, 90, 180, 270 degree on the end surface of the weight.

Insert the weights on the condition of their zero degree marks pointing to 12 clock respectively into the top mounting hole H31 and H41 in the first plane PL3 and the second plane PL4 of the rotor R1 shown in FIG. 2, i.e. into the two mounting holes at zero degree in the two end surfaces.

Measure the unbalance of the rotor mounted with the weights by the balancing machine, mark the unbalance in the first plane as UW31 and mark the unbalance in the second plane as UW41; take out the weight W3 and W4, rotate the weights a certain angle clockwise with respect to the first mounting condition, and then insert the weight W3 and W4 into the original mounting holes again. It is no special requirement for the rotating angle of the weights with respect to the mounting holes, in this example, 90 degree clockwise is used for the illustration. Then make the second measurement, the measured unbalance is respectively marked as UW32 and UW42. When measuring the unbalance, in order to improve the measuring accuracy, make multiple measurements in each step and record the average value of the multiple measurements as the measured unbalance value.

If the amount or the direction of the unbalance UW3 and UW32 of the rotor is not the same, it means that the mass center of the weight W3 is deviated from the center line of the weight, with the measured unbalance UW31 and UW32 and through the above procedure E and F for the unbalance measurement and correction of the rotor, calculate the unbalance of the weight W3, and make the eccentricity correction for the weight W3. In order to obtain the weight with the eccentricity approaching zero, make multiple measurements and corrections, till the amount difference between UW31 and UW32 is smaller than or approaching the set value and the direction difference is smaller than or approaching the set value; make the same procedures for the weight W4. After the above procedures, the deviation between the mass center of the weight and its center line is smaller than the set value or approaching zero.

Use the balance to weigh the mass of the weight W3 and W4 being obtained through the above procedures, and mark the mass respectively as m3 and m4.

Mark the weights being obtained through above balance measurement and correction, with the deviation between the mass center and its center line smaller than then set value, with the mass of m3 and m4, as W3D and W4D. W3D and W4D is the weight to generate the unbalance which is the product of the mass of the weight and the distance between the rotational center of the weight and the rotation axis of the rotor.

Figure 14:
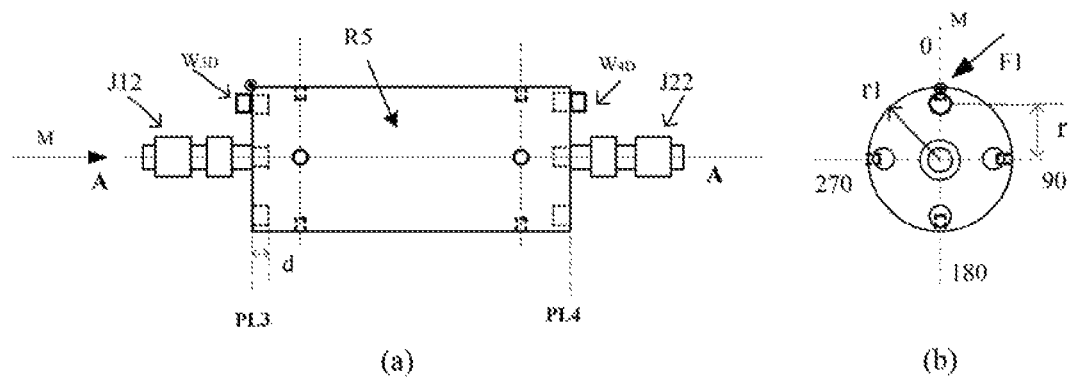
FIG. 14 shows the rotor with the traceable unbalance, (a) is the main view of the rotor, (b) is the side view of the rotor.

Insert the weight W3D and W4D respectively into the top mounting hole H31 and H41 in the first plane PL3 and the second plane PL4 of the rotor R3 with zero unbalance. The rotor in this condition is marked as R5, see to FIG. 14. The amount of the unbalance of the rotor R5 in the plane PL3 is m3*r(kg*m), the angle is zero degree, the amount of the unbalance of the rotor R5 in the plane PL4 is m4*r(kg*m), the angle is zero degree.

The mass unit for m3 and m4 is kg, the length unit of r is m, the angle unit is degree (can be converted to Rad); the amount and the angle of the unbalance being generated by the weight W3D and W4D, or say the unbalance of the rotor R5, is related to the basic units (mass Kg and length m) of International System of Units and the auxiliary units (plane angle radian Rad). Thus, the weight with the traceable unbalance and the rotor with the traceable unbalance is obtained.

To ensure the mass center of the weight is in the plane of the rotor for mounting the weight, the above procedure C and H for manufacturing the weight can be combined, for the weight being manufactured in the procedure C, the mass center is not only in the middle position in length direction, but also in the central symmetry axis of the weight; for the weight being manufactured in the procedure H, the mass center is not only in the center line, but also in the middle position in the length direction of the weight.

I. The present invention also provides a method for measuring the unbalance amount of the rotor: the balancing machine is arranged in horizontal layout with the roller supporting the rotor, the axis limit to the rotor by the balancing machine is acted in the center of the end surface of the rotor rotation axis, zero angle reference for the unbalance is set on the rotor. Use the drive unit of the balancing machine to accelerate the rotor to the measuring speed, then the drive unit disengage the rotor automatically, or the drive unit supply no more driving power but rotates with the inertia as the rotor does. Make the balance measurement on the condition of the rotor rotating with the inertia. In this arrangement, all the parts contacting the rotor and having relative movement with respect to the rotor on the balancing machine, have no variable force to the rotor perpendicular to the rotation axis of the rotor. In this condition, by shifting the zero angle reference on the rotor, the unbalance of the rotor is acquired.

Figure 15:
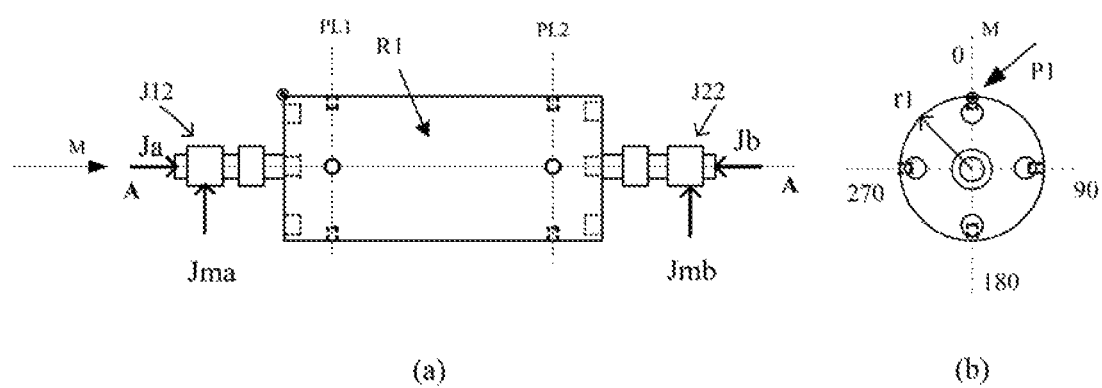
FIG. 15 shows the rotor with the zero-angle reference point, (a) is the main view of the rotor, (b) is the side view of the rotor.
Figure 16:
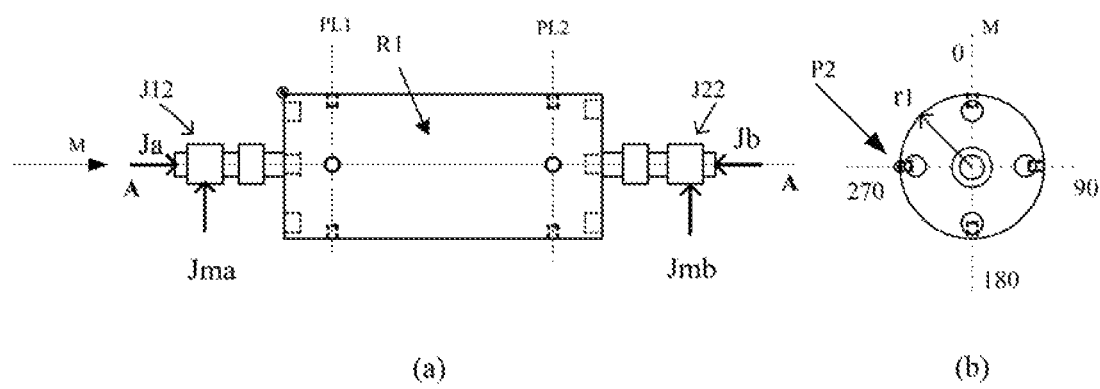
FIG. 16 shows the zero-angle reference point on the rotor being shifted for a certain angle, (a) is the main view of the rotor, (b) is the side view of the rotor.

The method for the angle shifting is following, in the first measurement, make an angle reference point P1 at any position on the rotor, see to FIG. 15. After the first measurement, remove the original angle reference P1 from the rotor, make a new angle reference point P2 deviating a certain angle from the original reference point P1. In this implementing example, angle reference point is shifted with 90 degree counterclockwise, see to FIG. 16. For the rotor R1, the angle reference point being shifted with 90 degree counterclockwise equals to the rotor being rotated 90 degree clockwise with respect to the sleeves when mounting the sleeves. Make the second measurement after the new reference point P2 is set. With the unbalance being measured in the first measurement and the second measurement, through the method and the steps in the above procedure R the unbalance of the rotor R1 is acquired.

Through using the present invention and the current technology, the different purpose can be realized by the below methods.

J. the calibration for the balancing machine: respectively use the rotor R3 with zero unbalance and the rotor R4 or R5 with the traceable unbalance, to calibrate the zero point and a defined unbalance to realize the calibration for the balancing machine.

K. The inspection for the balancing machine: use the rotor R3 with zero unbalance and the rotor R4 or R5 with the traceable unbalance, to inspect any balancing machine, verify the measuring results in the two conditions to judge whether the measurement of the balancing machine is accurate.

L. Manufacture the rotor with zero unbalance for different grade, and the rotor with the traceable unbalance for different grade: after the rotor R3 with zero unbalance and the rotor R4 or R5 with the traceable unbalance is obtained, use the procedure J to calibrate the balancing machine, and after make the double check in the procedure K, manufacture the new rotor Ra with zero unbalance and the new rotor Rb with the traceable unbalance by the balancing, by this way, the rotor Ra with zero, unbalance for another grade or the rotor Rb with the traceable unbalance for another grade is obtained.

The above content illustrates the methods of the implementation in the present invention, the present invention is not limited to the above methods. Based on the technical thoughts of the present invention any change for the methods of the implementation can be made, and not all the steps for the above method are obligatory. For example, on the site for actually operating the balancing machine, considering the structure of the balancing machine, the structure of the rotor and the site condition, the axial limit and the balancing rotational drive to the assembly by the balancing machine is not always acted on the sleeves, but on the rotor, as long as the limit surface with the good finish on the rotor, the variable force being caused by the limit part to the rotor can be ignored, according to the method of the present invention, the rotor with enough precision and definite unbalance can be obtained to fulfill the inspection requirement for the unbalance; the zero angle reference point can be set on the rotor instead of the sleeve, as long as shifting the zero angle reference point with the corresponding angle in reverse direction after the rotor being rotated a certain angle.

In addition, the structure being used in the method for the implementation in the present invention is following, making the rotational journal on the two ends of the rotor, the rotational journals form the rotation axis of the rotor, during the measurement, mount the sleeves onto the rotational journals, the balancing machine contacts the peripheral structure of the sleeves, as the variant example, the inner circle instead of the rotational journals on the two ends can be made on the rotor, during the measurement, insert the sleeve into the inner circle, the balancing machine contacts the inner hole of the sleeve.

We claim:

1. A method for acquiring an unbalance of a rotor with a rotation axis, comprising:
    mounting a connecting part with a rotation axis onto the rotor to form an assembly, wherein the rotation axis of the connecting part forms a rotation axis of the assembly, the rotor is capable of being rotated relative to the connecting part to a certain angle, the relative position between the rotation axis of the rotor and the rotation axis of the assembly is kept unchanged before and after the rotor and the connecting part are relatively rotated with the certain angle;
    selecting a measuring plane on the rotor and using a balancing machine to measure the unbalance of the assembly in the measuring plane;
    rotating the rotor with the certain angle, clockwise or anticlockwise, with respect to the connecting part, and measuring the unbalance of the assembly in the measuring plane again; and
    acquiring the unbalance of the rotor through vector relationship of the results in the two measurements;
    wherein the vector relationship is performed as follows:
    connecting vector ends of the first unbalance and the second unbalance to form a line, and
    making an isosceles triangle with the line as a base side, wherein a vertex angle of the isosceles triangle is the angle of the rotor rotates relatively to the connecting part from the first measurement to the second measurement, and further from the isosceles side of the vertex to the vector end of the first measurement to the isosceles side of the vertex to the vector end of the second measurement is respectively clockwise or anticlockwise; before the rotor rotates relatively to the connecting part, the unbalance of the rotor is the vector from the vertex to the unbalance vector end of the first measurement; and after the rotor rotates relatively to the connecting part, the unbalance of the rotor is the vector from the vertex to the unbalance vector end of the second measurement.

2. The method according to claim 1, further comprising:
    setting a zero angle reference point for balance measurement on the connecting part before the rotor and the connecting part are relatively rotated with the certain angle;
    when measuring the unbalance of the assembly, the balancing machine contacts the rotor via the connecting part, the rotor has no contact with the balancing machine except contacting the connecting part.

3. The method according to claim 2, wherein more than one journal is respectively defined at two ends of the rotor, and the two journals at the outer side of the rotor form the rotation axis of the rotor with the supporting of support parts on the balancing machine; the connecting part is a sleeve, and two sleeves are respectively mounted on the two journals at the outer side of the rotor to form the assembly, outer circles of the two sleeves form the rotation axis of the assembly.

4. The method according to claim 1, wherein more than one journal is respectively defined at two ends of the rotor, and the two journals at the outer side of the rotor form the rotation axis of the rotor with the supporting of support parts on the balancing machine; the connecting part is a sleeve, and two sleeves are respectively mounted on the two journals at the outer side of the rotor to form the assembly, outer circles of the two sleeves form the rotation axis of the assembly.

5. A method for manufacturing a rotor with an unbalance smaller than a preset value, comprising:
    acquiring an unbalance of the rotor with the method mentioned in claim 1; and
    correcting the unbalance of the rotor so as to make the unbalance smaller than the preset value.

6. The method according to claim 1, wherein the machine unbalance is the vector from the coordinate zero point to the vertex of the isosceles triangle.

* * * * *